United States Patent [19]
Smith et al.

[11] Patent Number: 6,148,054
[45] Date of Patent: Nov. 14, 2000

[54] REMOVABLE SEPARATION DEVICES FOR NUCLEAR FUEL BUNDLES

[75] Inventors: David G. Smith, Leland; Harold B. King, Wrightsville Beach, both of N.C.

[73] Assignee: General Electric Company, Schenectady, N.Y.

[21] Appl. No.: 09/188,100

[22] Filed: Nov. 9, 1998

[51] Int. Cl.⁷ .................................................. G21C 3/322
[52] U.S. Cl. ...................... 376/444; 376/435; 376/439; 376/443; 376/462
[58] Field of Search .................... 376/444, 443, 376/439, 435, 462

[56] References Cited

U.S. PATENT DOCUMENTS

| | | | |
|---|---|---|---|
| 4,089,742 | 5/1978 | Amaral et al. | 376/444 |
| 4,132,115 | 1/1979 | Benemann et al. | 73/349 |
| 4,579,711 | 4/1986 | Mishima et al. | 376/442 |
| 5,017,332 | 5/1991 | Dix et al. | 376/370 |
| 5,091,146 | 2/1992 | Dix | 376/443 |
| 5,112,570 | 5/1992 | Dix et al. | 376/370 |
| 5,178,825 | 1/1993 | Johansson | 376/438 |
| 5,209,899 | 5/1993 | Johansson et al. | 376/442 |
| 5,229,068 | 7/1993 | Johansson et al. | 376/371 |
| 5,345,485 | 9/1994 | Patterson et al. | 376/435 |
| 5,375,152 | 12/1994 | Patterson et al. | 376/435 |
| 5,384,815 | 1/1995 | Patterson et al. | 376/444 |
| 5,416,812 | 5/1995 | Matzner | 376/371 |
| 5,491,733 | 2/1996 | Patterson et al. | 376/443 |
| 5,598,450 | 1/1997 | Proebstle et al. | 376/435 |
| 5,668,728 | 9/1997 | Dix et al. | 376/443 |
| 5,859,888 | 1/1999 | Elkins et al. | 376/443 |

FOREIGN PATENT DOCUMENTS

| | | |
|---|---|---|
| 0 523 265 | 1/1993 | European Pat. Off. . |
| 1585673 | 12/1969 | France . |
| 63-144290 | 6/1988 | Japan . |
| 1-169395 | 7/1989 | Japan . |
| 3-051796 | 3/1991 | Japan . |

*Primary Examiner*—Charles T. Jordan
*Assistant Examiner*—Jack Keith
*Attorney, Agent, or Firm*—Nixon & Vanderhye

[57] ABSTRACT

A support rod 14 carrying one or more separation devices 12, e.g., swirlers, is releasably secured in a fuel bundle. The support rod and separation devices are sized to pass through openings in the spacers S otherwise containing full length fuel rods. The lower end of the support rod is releasably connected to the upper end of a part-length fuel rod PLR which in turn is releasably connected to the lower tie plate. The support rod, separation devices and part-length rod may be installed and removed relative to the fuel bundle as an integral assembly with the part-length rod and separation devices passing through the openings in the spacers. When installed, the separation devices lie above upper spacers in the vent volumes to flow liquid on and into the interstices of the surrounding fuel rods.

3 Claims, 6 Drawing Sheets

REMOVABLE SEPARATION DEVICES FOR NUCLEAR FUEL BUNDLES

TECHNICAL FIELD

The present invention relates to fluid separation devices for use in vent volumes within a nuclear fuel bundle and particularly to devices insertable into and removable from the fuel bundle for flowing liquid laterally outwardly into the interstices between and onto adjacent surrounding fuel rods.

BACKGROUND OF THE INVENTION

A typical boiling water nuclear reactor has a reactor core comprised of a plurality of fuel bundles in side-by-side relation to one another. Coolant/moderator flows upwardly within the fuel bundles and about the fuel rods within the fuel bundles and is converted to steam to produce power.

In U.S. Pat. No. 5,112,570, there is illustrated a fuel bundle having a plurality of part-length fuel rods (PLR). These PLR's are supported on the lower tie plate of each bundle and extend upwardly toward the upper tie plate. The rods, however, terminate short of the upper tie plate and typically between a pair of spacers along the fuel bundle. Between the upper end of each PLR and the upper tie plate, there is defined in the upper two-phase region of the fuel bundle a vent volume. This vent volume preferentially receives vapor from the two phase mixture of liquid and vapor in the upper region of the fuel bundle during power producing operations. There are many advantages associated with the use of PLR's including the increased vapor fraction within the vent volume and the pressure drop reduction in the upper two phase region of the bundle. These advantages include increased stability from thermal hydraulic and nuclear instabilities.

It will be appreciated that the mechanical hardware associated with fuel rod spacers causes local reduction in the flow area available for the vapor and liquid flowing through the fuel bundle. This causes significant pressure drops to occur as the flow passes each spacer. By using PLR's, the associated flow blockage effects of one or more of the full-length fuel rods extending through these spacers above the PLR is substantially eliminated. That is, because of the absence of a fuel rod at a lattice location above one or more PLR's, additional flow area through the spacer is obtained with consequent reduction in pressure drop across such spacer. As a consequence, significant flow diversion occurs into the lower pressure drop paths or vent volumes above the upper ends of the PLR's. Increased vapor and liquid are therefore pumped from surrounding flow passages, i.e., the interstitial regions around the adjacent fuel rods, into these vent volumes.

The creation of vent volumes above PLR's, and flow diversions resulting therefrom, however, can cause some reduction in critical power performance in the fuel bundle. Additional water may accumulate in the vent volume region above the PLR and thus be shunted out of the vent volume without heat generating contact with the remainder of the full-length fuel rods. Separation devices have been utilized to drive the dense liquid or water out of the vent volumes in generally lateral directions onto the surfaces of and into the interstitial regions between the full-length fuel rods to improve heat transfer performance. Such separation devices have generally taken the form of swirlers disposed in the vent volumes. These swirlers create a helical flow pattern causing the dense liquid to be driven laterally outwardly of the vent volume by centrifugal force. Such separation devices have been located within the spacers and have extended therefrom above or below the spacers. However, the separation devices are typically connected to the spacers, at least in part closing off the opening through the spacer, preventing access to a part-length rod in the registering opening or openings below the closed opening(s) of the superposed spacer(s). This complicates bundle assembly because typically the separation devices are not separate entities which can be removed and then reinstalled into the bundle assembly at the assembly site or in the field. For example, in the case of a failed part-length rod underlying one or more superposed spacers containing separation devices, the part-length rod cannot be removed from the bundle without disassembly of the bundle.

BRIEF SUMMARY OF THE INVENTION

According to the present invention, and in one aspect thereof, there is provided a fuel bundle for a nuclear reactor having a vent volume above a part-length fuel rod wherein one or more separation devices are carried by a support structure, e.g., a rod which can be inserted through and removed from the one or more registering openings of the spacers in registration above a part-length rod. The support rod carries at its lower end a connecting structure for engagement and connection with a mating connecting structure on the upper end of the part-length rod. The separation devices are preferably in the form of swirlers, which are located within the vent volumes between adjacent spacers when the support rod is connected to the part-length rod. Particularly, the swirlers are spaced just above the underlying spacer. The separation device and spacer opening or openings are sized relative to one another to enable withdrawal of the support rod and separation device through the spacer opening or openings upon disconnection of the upper and lower connecting structures of the support rod and the part-length fuel rod, respectively. This facilitates assembly of the fuel bundle and permits withdrawal in the field of a failed part-length rod by removal of the overlying support rod and separation device(s).

In another aspect of the present invention, it will be appreciated that the part-length fuel rod is typically coupled to the lower tie plate, for example, by a threaded connection. By coupling the support rod for the swirler to the upper end of the part-length rod prior to assembly in the bundle, the support rod with attached swirlers, together with the part-length rod, may be inserted into the bundle through the registering openings of the spacers upon assembly of the fuel bundle. The support rod may then be used to screwthread the part-length rod into the tie plate, thus facilitating assembly of the fuel bundle. The support rod and part-length rod likewise can be removed from the bundle as a unit on-site, by unthreading the part-length rod from the lower tie plate and withdrawing the combined support rod, part-length rod and separation device(s) through the registering openings of the spacers.

In both of the preceding aspects, and when using a ferrule-type spacer, the ferrule(s) of the spacer(s) in the vent volume above the part-length rod may be omitted. The swirler above each spacer may then comprise multiple blades having tips extending laterally to overlie the corners of the vent volume portion within the spacer. Thus, substantial portions of the entire vent volume area within the spacer are vertically aligned with the blades of the swirler. This requires substantially the entirety of the flow through the spacer opening left by the omitted ferrule to flow against the swirler blades for deflection laterally outwardly onto adjacent fuel rods. Moreover, the thickness of the spacer and the pitch of the swirler blades, in another form, can be such that the bladed swirler can be rotated, i.e., threaded past the spacer upon axial insertion and removal of the support rod carrying the swirlers. In this manner, an even larger area of the vent volume can lie in axial alignment with an overlying swirler.

In another aspect of the present invention, the support rod may extend the full length of the fuel bundle, passing through the registering openings of the spacers between the upper and lower tie plates. One or more separation devices, e.g., swirlers, may be disposed at discrete locations along the support rod or, alternatively, the support rod may carry a separation device substantially along its full length. For example, a continuous helical swirler can extend about substantially the full length of the support rod for flowing a liquid laterally outwardly onto the surfaces and into the interstices of the surrounding full-length fuel rods. In this form, the support rod and swirler(s) may extend through the ferrules at those lattice locations in the spacers.

In a preferred embodiment according to the present invention, there is provided a fuel bundle for a nuclear reactor comprising a plurality of fuel rods spaced laterally from one another in a matrix thereof enabling flow of liquid about the rods from a lower end of the fuel bundle toward an upper end thereof, a plurality of spacers spaced one from the other along the fuel bundle, each spacer having openings for receiving the fuel rods and maintaining the rods spaced from one another in the matrix thereof, at least one of the rods being a part-length fuel rod terminating in an upper end below upper ends of surrounding fuel rods and below at least one of the plurality of spacers, the part-length rod defining with respect to the surrounding rods a vent volume overlying the part-length rod and having a connecting structure adjacent an upper end thereof, a support structure extending through an opening in one spacer in registration with the part-length rod and having a connecting structure adjacent a lower end thereof, the support structure carrying a separation device disposed in the vent volume when the upper and lower connecting structures are connected to one another for flowing liquid laterally outwardly onto surfaces and into interstices of the surrounding fuel rods, the separation device and the opening of the one spacer being sized relative to one another to enable withdrawal of the support structure and the separation device through the opening of the one spacer.

In a further preferred embodiment according to the present invention, there is provided a fuel bundle for a nuclear reactor comprising a tie plate, a plurality of rods including fuel rods spaced laterally from one another in a matrix thereof and connected to the tie plate, enabling flow of liquid about the rods from a lower end of the fuel bundle toward an upper end thereof, a plurality of spacers spaced one from another along the fuel bundle and having openings for receiving the fuel rods and maintaining the rods spaced from one another in the matrix thereof, a support structure extending through registering openings in the spacers and having a coupling structure adjacent a lower end thereof for releasably coupling the support structure and the tie plate to one another, the support structure carrying a separation device for flowing liquid laterally outwardly onto the surfaces and into the interstices of surrounding fuel rods, the separation device and the registering spacer openings being sized relative to one another to enable withdrawal of the support structure and the separation device through the registering spacer openings upon disconnecting the support structure and the tie plate relative to one another.

In a still further preferred embodiment according to the present invention, there is provided in a fuel bundle for a nuclear reactor having (i) a plurality of fuel rods spaced laterally from one another in a matrix thereof enabling flow of liquid about the rods from a lower end of the fuel bundle toward an upper end thereof, (ii) a plurality of spacers spaced one from the other along the fuel bundle, each spacer having openings for receiving the fuel rods and maintaining the rods spaced from one another in the matrix thereof and (iii) at least one of the rods being a part-length fuel rod terminating in an upper end below upper ends of surrounding fuel rods and below at least one of the plurality of spacers, comprising the steps of providing a support structure extending through an opening in the one spacer in vertical registration with the part-length rod, providing a separation device on the support structure, locating the support structure in the fuel bundle with the separation device below the one spacer, withdrawing the support structure and the separation device through the opening of the one spacer enabling removal of the support structure and the separation device from the fuel bundle.

Accordingly, it is a primary object of the present invention to provide removable separation devices for the vent volumes of nuclear fuel bundles enabling insertion and removal of support rods carrying separation devices as well as part-length rods relative to the fuel bundle.

DETAILED DESCRIPTION OF THE INVENTION

Figure 1:
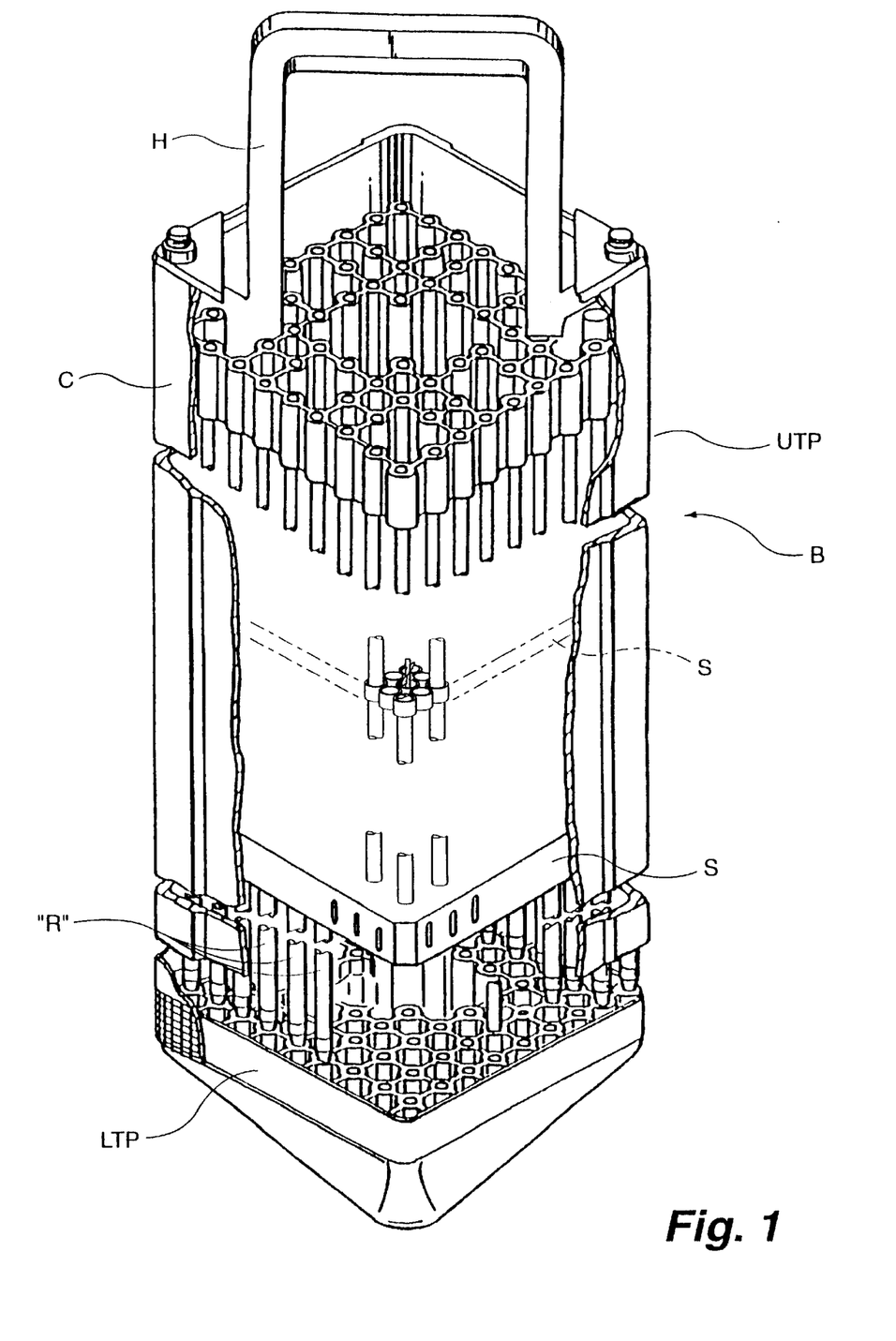
FIG. 1 is a fragmentary perspective view with portions broken out and in cross section illustrating a nuclear fuel bundle constructed in accordance with the present invention.

Referring now to the drawings, particularly to FIG. 1, there is illustrated a nuclear fuel bundle generally designated B having a channel C encompassing an upper tie plate UTP and a lower tie plate LTP. Within the channel C, there is provided a plurality of nuclear fuel rods R supported on the lower tie plate LTP and which rods extend upwardly toward and to the upper tie plate UTP. A plurality of spacers S are vertically spaced one from the other throughout the height of the fuel bundle B and defines discrete vertically aligned openings at lattice positions in a regular array of such openings to receive and confine the rods R within the bundle B against lateral movement relative to one another. Generally, six to nine spacers are provided, only two of which are illustrated in FIG. 1. Such spacers may be of a ferrule type, for example, as described and illustrated in U.S. Pat. No. 5,178,825 of common assignee herewith or which may be of the type described and illustrated in U.S. Pat. No. 5,209,899, the disclosures of which are incorporated herein by reference. It will be appreciated that other types of spacers than those set forth in these two patents may be used in the context of the present invention. The ferrule-type spacer illustrated in the drawing figures includes a plurality of cylinders 11 arranged in side-by-side parallel relation and through which fuel rods R extend. The fuel rods are maintained spaced from the cylindrical walls of the ferrules by radially inwardly directed protrusions 13 (FIG. 4) in engagement with the fuel rods R. It will also be appreciated from a review of FIG. 1 that a 9×9 array of rods R is illustrated and that other arrays may be utilized with the present invention, for example, 8×8 or 10×10 arrays. A handle H is also illustrated in FIG. 1 for purposes of lifting the fuel bundle relative to a nuclear fuel core, not shown.

When utilizing the fuel bundle B in the core of a nuclear reactor, for example, a BWR, coolant/moderator, e.g. water, enters through the lower tie plate LTP for flow upwardly and about the rods R. During upward passage of this water, steam is generated and a vapor and liquid mixture passes upwardly through the upper tie plate UTP. During steam generation, the channel C confines the coolant/moderator flow within the nuclear fuel bundle and isolates that flow from a core bypass volume flowing outside the channel C and between similarly disposed fuel bundles, not shown.

Not each lattice position of the lattice or array of openings across the spacers, however, is occupied by a full length fuel rod R. For example, one or more water rods or moderator rods may pass upwardly through the central portion of the bundle B and occupy a number of lattice positions. Additionally, one or more part-length rods PLR may be provided in selected lattice positions in the fuel bundle B. Thus, for example, each part-length rod may extend from the lower tie plate LTP upwardly in the fuel bundle through the first three or four spacers and terminate just above the fourth spacer. Part-length rods are typically terminated in or just above the spacer to provide support for the otherwise cantilevered ends of the part-length rod. Further, a full-length fuel rod may be replaced by a rod containing no nuclear fuel. In accordance with this invention, separation devices are provided on structures above part-length fuel rods (FIGS. 1A, 2 and 3) or structures replacing a fuel rod and extending the full length of the fuel bundle.

Figure 2:
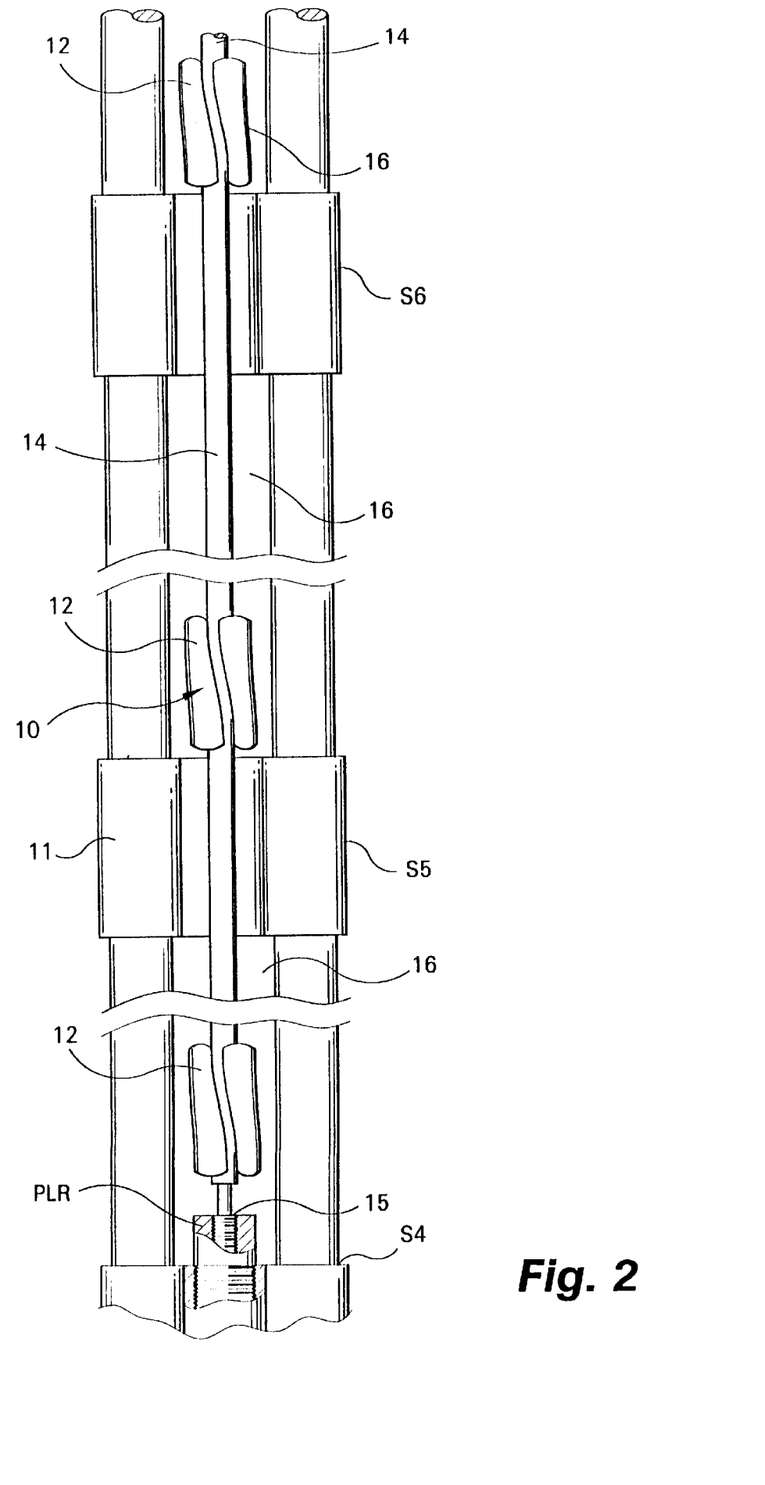
FIG. 2 is a fragmentary enlarged view with portions broken out for clarity of superposed spacers with fuel rods through the ferrules thereof and separation devices above each spacer and an underlying part-length rod in accordance with the present invention.
Figure 3:
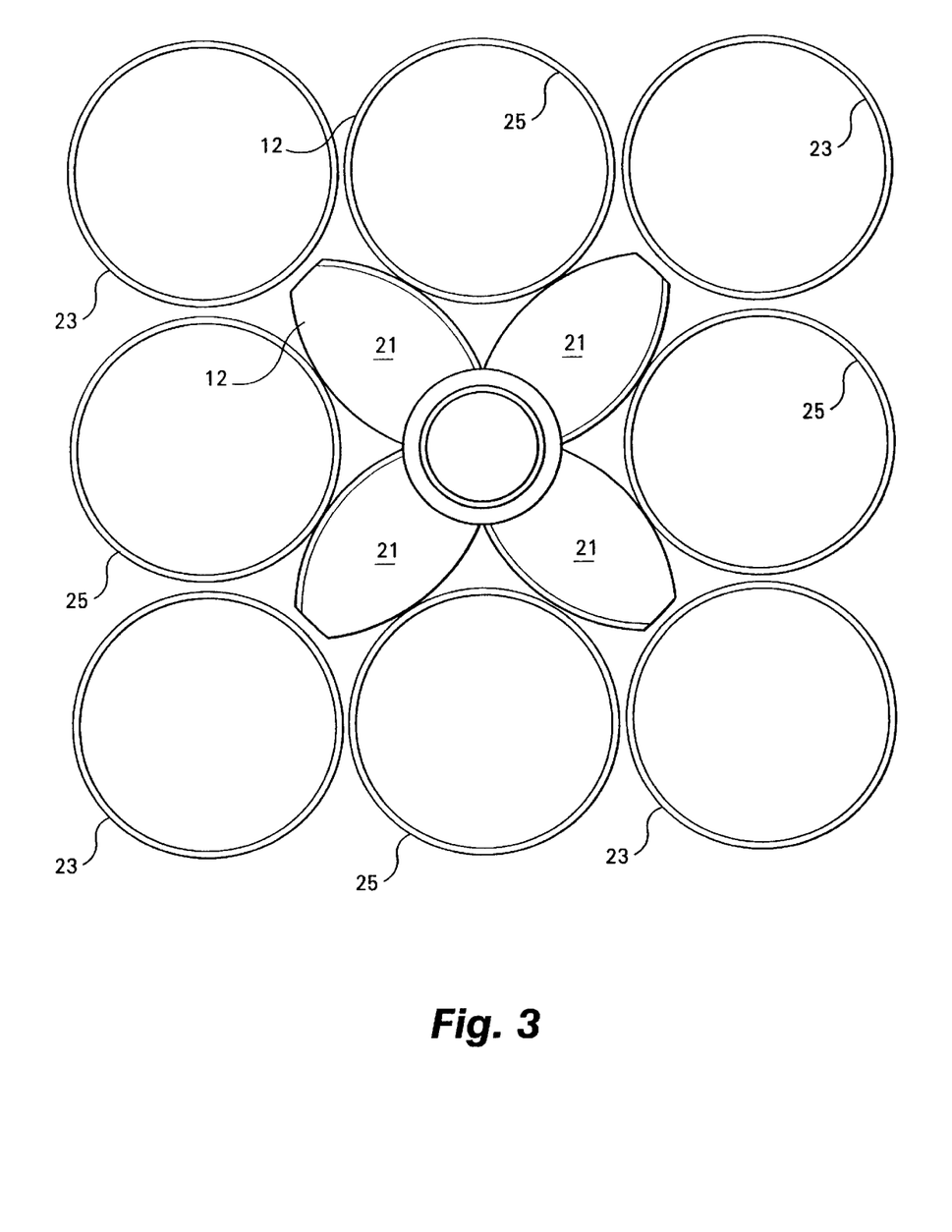
FIG. 3 is an enlarged plan view of a number of the ferrules of a spacer with the ferrule in the vent volume omitted and illustrating the configuration of a separation device overlying the spacer.

Referring now to FIG. 2, the upper end of a part-length rod PLR extends just above a spacer, for example, spacer $S_4$. As illustrated, the volume above the part-length rod is not occupied by a fuel rod. Such volume constitutes a vent volume 16 which passes through superposed, axially registering, openings in spacers higher in the fuel bundle, e.g., spacers $S_4$, $S_5$ and $S_6$. Also, as illustrated in FIGS. 2 and 3, the ferrule of each spacer S in the vent volume above the part-length rod is omitted.

In accordance with the present invention, a separation device generally indicated 10 is provided in the vent volume 16 above one or more of the spacers superposed over the part-length fuel rod PLR and particularly projecting over substantially the entire plan area of the vent volume defined in the plane of the spacer(s) by the ferrules surrounding the omitted ferrule. Particularly, the separation devices are provided in the bundle in a manner enabling the removal of the separation devices as well as the part-length rods from the bundle and reinsertion of the separation devices and part-length rods through the upper end of the fuel bundle. To accomplish this, the separation devices, for example, swirlers 12, are mounted on and carried by a support structure, e.g., a rod 14 receivable in the fuel bundle through the upper end thereof. The swirlers and support rod are sized relative to the openings through the spacers such that the rods and swirlers can pass through the spacers. In certain instances, and in using certain spacers, a rotation of the support rod and swirlers may be necessary to pass the swirlers through the spacers avoiding inwardly projecting protuberances on the spacers which typically hold the fuel rods in their designed lattice position.

Referring to FIG. 2, the lower end of the support rod 14 may be secured to the upper end of an underlying part-length fuel rod PLR. As a representative example of a connection between the support rod 14 and a PLR, the support rod 14 may have a reduced diameter threaded male part for threaded connection with a threaded female opening at the upper end of the PLR. Further, it will be appreciated that the PLR itself is releasably secured at its lower end to the tie plate. Such securement may comprise a threaded type joint indicated at 15 in FIG. 2. Consequently, the support rod 14, attached swirlers 12 and the part-length rod PLR may constitute a unitary assembly for insertion into and removal from the fuel bundle. Thus, the fuel bundle assembly process can be facilitated by first attaching the support rod to the part-length fuel rod and then inserting the assembled support and part-length rods through the openings in the spacers and securing the lower end of the part-length rod to the lower tie plate. Conversely, this enables both the support rod and the part-length rod to be removed as a unit from the fuel bundle by disconnecting the part-length rod from the lower tie plate. Preferably, upon insertion of the support rod and part-length rod, the swirlers are designed to be located in the vent volumes just above the spacers as illustrated. Consequently, flow through the spacer opening not occupied by a fuel length fuel rod encounters the swirler and the liquid is conveyed laterally onto and into the interstices of the surrounding full length fuel rods while the vapor flows upwardly in the vent volume.

Figure 1A:
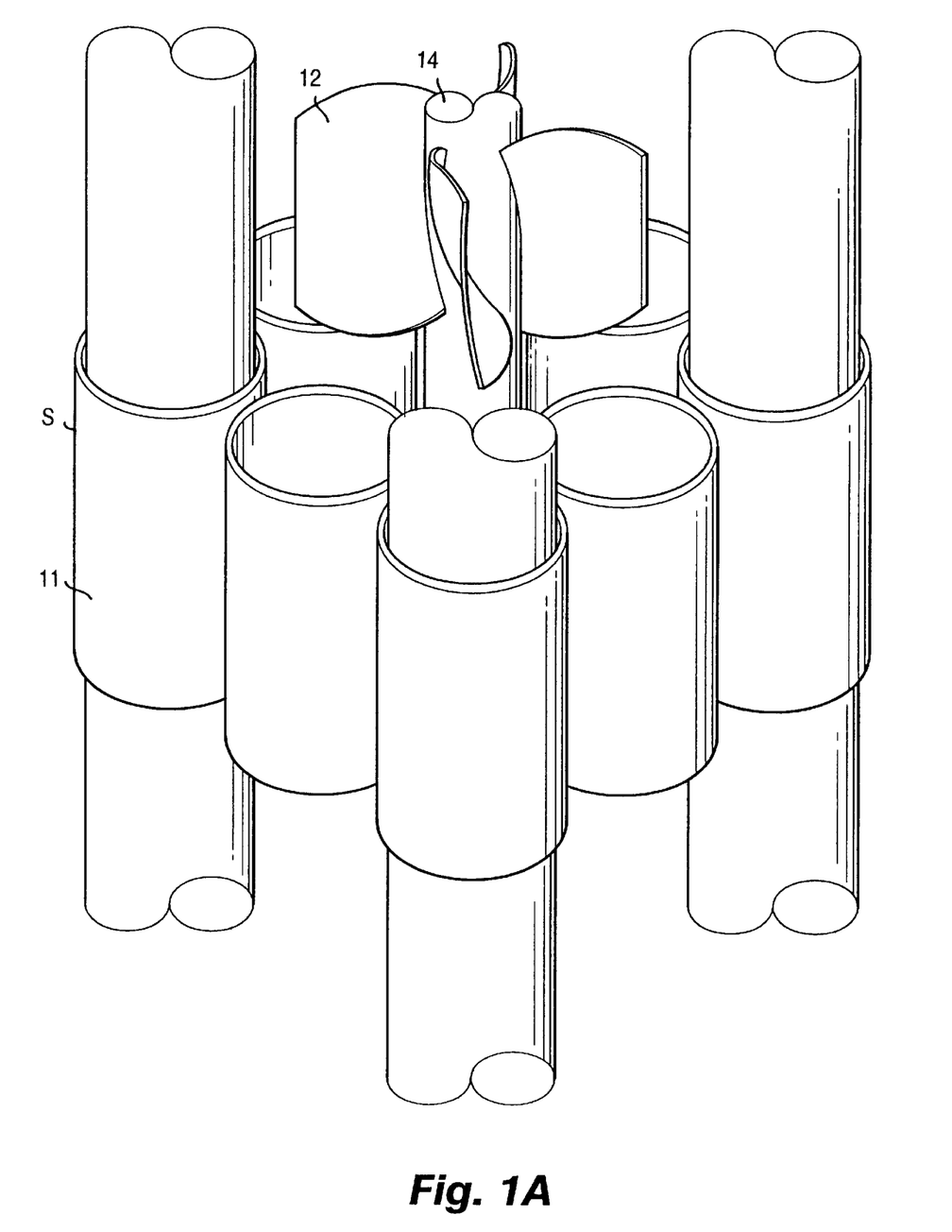
FIG. 1A is an enlarged fragmentary perspective view illustrating a ferrule type spacer with a separation device disposed above one of the ferrules.

In a preferred form of the invention, the area of the swirler projected onto the opening through the underlying spacer is maximized. For example, and in the case of a ferrule-type spacer, it will be appreciated that the ferrule underlying the swirler is removed from the spacer as illustrated in FIGS. 1A, 2 and 3, leaving a substantially square opening with outwardly projecting apices at the corners adjacent diagonally located ferrules. To maximize the projected plan area of the swirler onto that opening while simultaneously enabling the swirler and support structure therefor to pass through the spacers during assembly and repair of the fuel bundle, a swirler having four twisted blades 21 (FIG. 3) is provided. As illustrated in FIG. 3, the blades 21 project laterally such that, when projected onto the spacer opening, the blade tips extend to lie closely adjacent the diagonally arranged ferrules 23 and between the middle ferrules 25 forming the sides of the opening. Thus, the support structure with attached swirler and PLR can be inserted from the top of the bundle through the aligned openings in the spacers at the lattice positions where the ferrules are absent with the PLR passing through ferrules in the lower spacers whereby the PLR can be screwthreaded to the lower tie plate. Further, the thickness (height) of the spacer and the twist (pitch) of the blades 21 can be correlated such that the projected plan area of the swirlers with blades 21 can be increased whereby the swirlers overlie a greater proportion of the opening as well as portions of the spacer. Rotation of the support structure enables the swirlers to pass through the spacer openings during assembly and/or repair.

It will be appreciated that other types of separation devices may be used in the present invention than the disclosed and preferred swirlers 12. Additionally, the separation devices may extend the full length of the support rod 14 to its connection with the upper end of the part-length rod.

Figure 4:
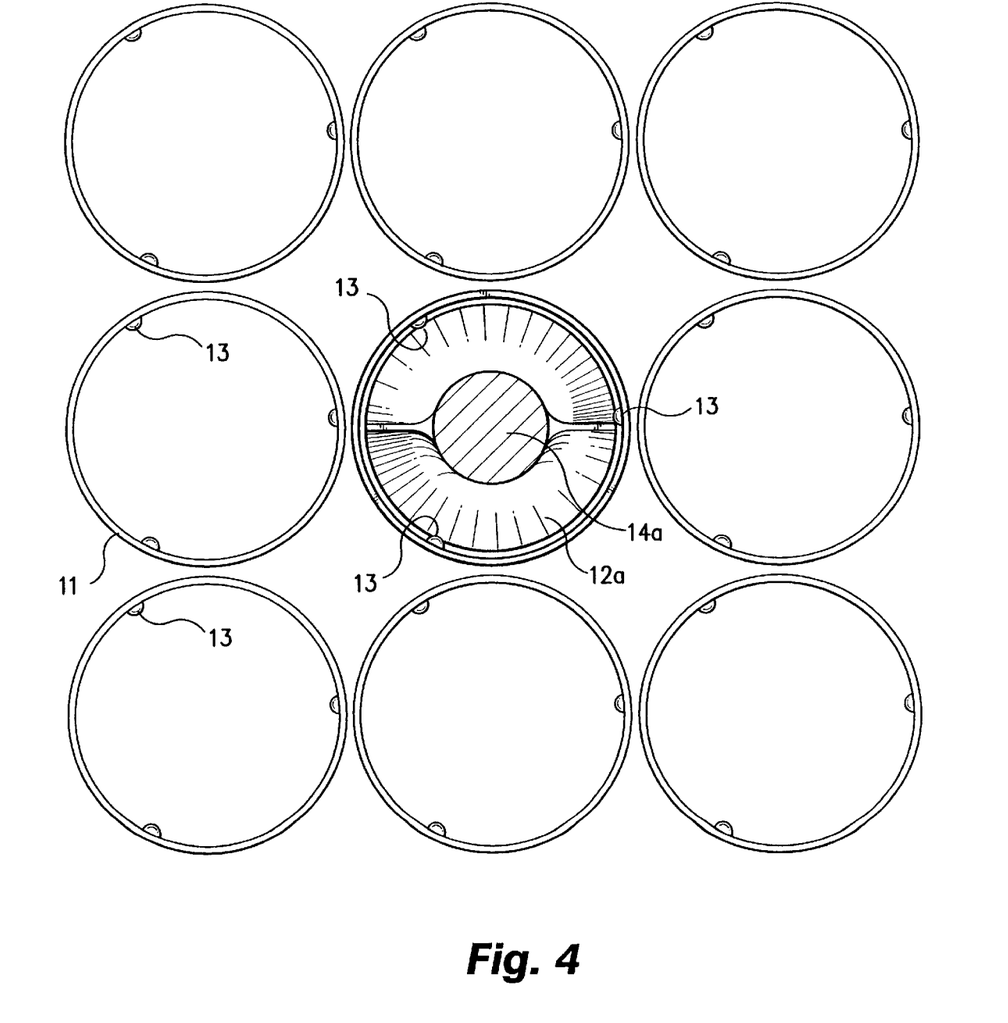
FIG. 4 is an enlarged plan view of a number of the ferrules of a spacer illustrating a full-length separation device, e.g., a swirler, passing through a ferrule in the vent volume.
Figure 5:
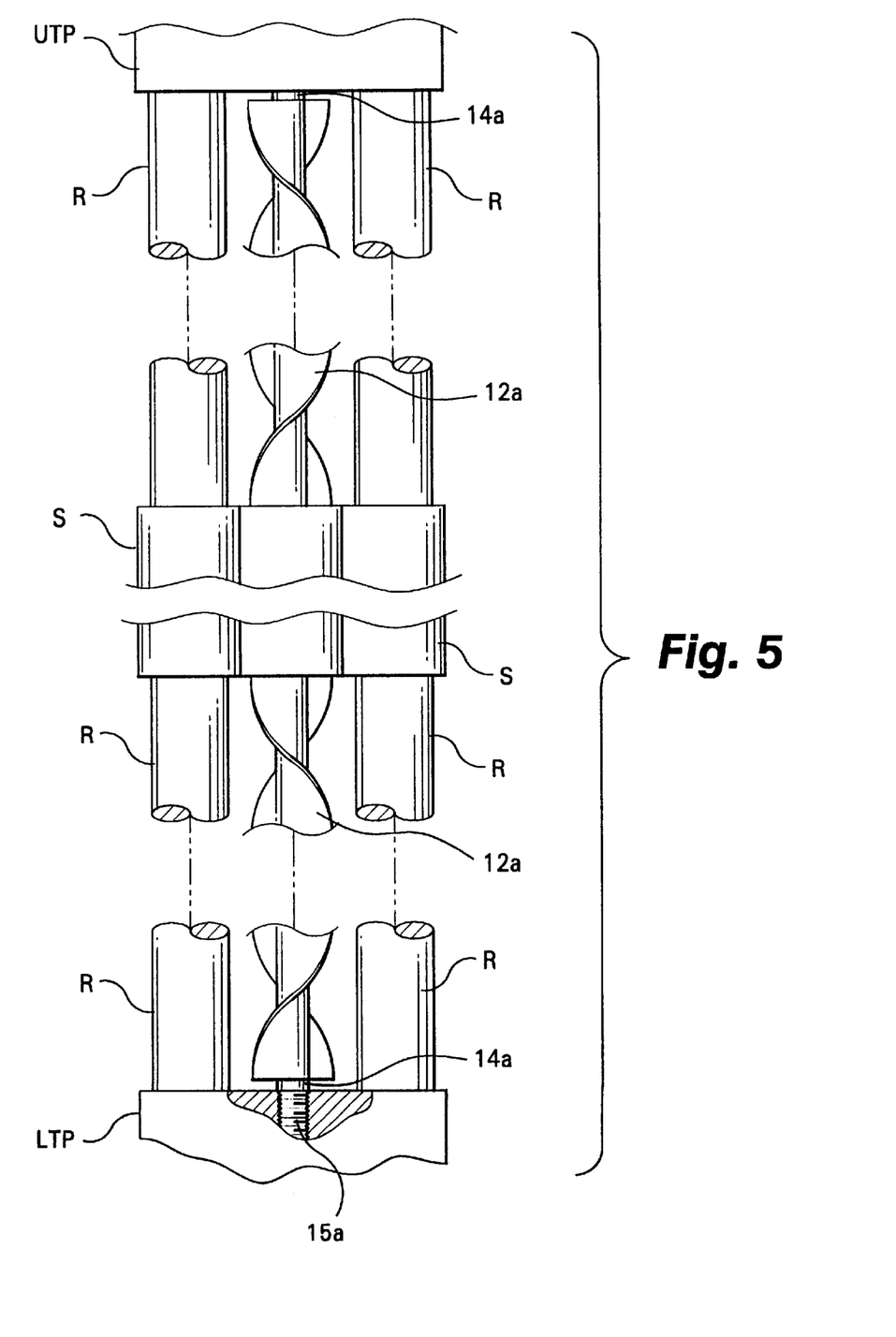
FIG. 5 is a fragmentary view of portions of the fuel bundle illustrating a full-length swirler and support rod.

Further, a support structure, e.g., a support rod may extend the full length of the fuel bundle having one or more separation devices or a continuous separation device along its length (FIGS. 4 and 5 described below). In any event, it will be appreciated that the support rod and separation devices are not supported by the spacers as typical in prior fuel bundles. Rather, the support rod and separation devices are directly supported by the part-length rod secured to the lower tie plate (FIGS. 1A, 2 and 3) or by the lower tie plate (FIGS. 4 and 5). The upper end of the support rod is suitably secured to the upper tie plate.

In FIGS. 4 and 5, the support structure, e.g., support rod 14*a* extends the full distance between the upper and lower tie plates. Additionally, the swirler 12*a* extends continuously along the rod 14*a* between the upper and lower tie plates, for example, connecting with the lower tie plate LTP in a threaded connection 15*a*. It will be appreciated that the swirler 12*a* may extend fully or partly between the spacers, and not within the spacers. Also, the swirlers and support structure may be inserted through the ferrules left behind in the event a full-length fuel rod is removed. That is, the pitch of the swirlers is such to enable the swirler to be rotated past the protrusions 13 in the ferrules as illustrated in FIG. 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel bundle for a nuclear reactor comprising:

a plurality of fuel rods spaced laterally from one another in a matrix thereof enabling flow of liquid about the rods from a lower end of the fuel bundle toward an upper end thereof;

a plurality of spacers spaced one from the other along the fuel bundle, each said spacer having openings for receiving the fuel rods and maintaining the rods spaced from one another in the matrix thereof;

at least one of said rods being a part-length fuel rod terminating in an upper end below upper ends of surrounding fuel rods and below at least one of said plurality of spacers, said part-length rod defining with respect to said surrounding rods a vent volume overlying said part-length rod and having a connecting structure adjacent an upper end thereof;

a support structure extending through an opening in said one spacer in registration with said part-length rod and having a connecting structure adjacent a lower end thereof, said support structure carrying a separation device disposed in the vent volume when said upper and lower connecting structures are connected to one another for flowing liquid laterally outwardly onto surfaces and into interstices of said surrounding fuel rods;

said separation device including a swirler projecting laterally outwardly of said support structure;

said separation device and the opening of said one spacer being sized relative to one another to enable withdrawal of said support structure and said separation device through the opening of said one spacer;

said spacers having a plurality of ferrules arranged in a regular rectilinear matrix thereof, an opening in said one spacer aligned vertically above said part-length rod being void of a ferrule, the swirler comprising a plurality of blades disposed above said opening void of the ferrule such that blade tips project laterally to overlie substantially the entirety of said opening void of the ferrule.

2. A fuel bundle according to claim 1 wherein said swirler blades have a plan area in part overlying portions of underlying ferrules adjacent said opening void of the ferrule, said swirler and said underlying ferrule portions being sized and configured to enable said blades to pass through said opening void of the ferrule in response to relative rotation of said support structure and said one spacer and axial movement of said structure relative to said one spacer.

3. A fuel bundle according to claim 1 wherein said opening void of a ferrule is substantially square and defined in part by apices at corners thereof adjacent diagonally located ferrules and middle ferrules between said diagonally adjacent ferrules, said blades projecting laterally such that when projected onto the spacer opening, blade tips extend closely adjacent said diagonal ferrules and between said middle ferrules.

* * * * *